United States Patent [19]
Tremblay et al.

[11] Patent Number: 5,364,443
[45] Date of Patent: Nov. 15, 1994

[54] PROCESS FOR COMBINED DECOATING AND MELTING OF ALUMINUM SCRAP CONTAMINATED WITH ORGANICS

[75] Inventors: Francois Tremblay; Gilles R. Turcotte; Serge Lavoie; Ghyslain Dubé; Sylvain P. Tremblay; Jean-Yves Fortin, all of Québec, Canada

[73] Assignee: Alcan International Limited, Montreal, Canada

[21] Appl. No.: 160,435

[22] Filed: Dec. 1, 1993

[51] Int. Cl.$^5$ ............... C22B 9/16; C22B 21/00
[52] U.S. Cl. ........................... 75/403; 75/687
[58] Field of Search ............ 75/401, 687, 403; 266/901

[56] References Cited

U.S. PATENT DOCUMENTS

| | | |
|---|---|---|
| 4,365,993 | 12/1982 | Meredith et al. |
| 4,508,564 | 4/1985 | Kennedy ........................... 75/687 |
| 4,955,587 | 9/1990 | Sulzbacher et al. ............ 266/156 |
| 5,122,181 | 6/1992 | Dube et al. ..................... 75/10.21 |

FOREIGN PATENT DOCUMENTS

WO92/01825 2/1992 WIPO.
WO93/06253 4/1993 WIPO.

OTHER PUBLICATIONS

*Alcan Research Disclosure* 33599 Mar. 1992.

*Primary Examiner*—Melvyn J. Andrews
*Attorney, Agent, or Firm*—Cooper & Dunham

[57] ABSTRACT

A method of recovering an aluminum-containing metal from a scrap material containing the metal and an organic contaminant, such as paper, plastics, lacquer, paint or oil. The method involves creating a fluidized bed of solid particles, maintaining a zone of the bed at a temperature in the range of the melting point of the metal to 1000° C., introducing the scrap material into the fluidized zone to cause decoating of the metal within a time in the range of 1 to 40 seconds, at least partially melting the metal, and removing the metal material from the fluidized bed. In this way, decoating and at least partial melting is achieved essentially at the same time for improved efficiency. Metals of different melting point may also be separated from each other by providing a series of temperature zones in the fluidized bed (or in a series of fluidized beds) of progressively increasing temperature. If a limited amount of oxygen is introduced into the bed, a combustible gas is produced that can be burned to extract its energy or can be stored for later use.

30 Claims, 4 Drawing Sheets

PROCESS FOR COMBINED DECOATING AND MELTING OF ALUMINUM SCRAP CONTAMINATED WITH ORGANICS

BACKGROUND OF THE INVENTION

1. Field of the Invention

This invention relates to the recycling of scrap material containing metallic aluminum or aluminum alloy contaminated with organic materials, such as paper, plastics, paint, lacquer, etc.

2. Description of the Prior Art

The recycling of process or post-consumer aluminum scrap materials is carried out on a large scale nowadays both for environmental and economic reasons. This is particularly true of such products as used beverage cans, metal turnings from manufacturing plants, recycled household waste, used aluminum foil, foil packaging materials, and the like. Known recycling processes involve melting the metal component of the waste material so that it can be recast into useful products. Before this can be done, however, it is usually necessary to remove contaminating organic materials, such as paper, plastics, lacquer, paints, oils and the like, in order to avoid contamination and oxidation of the molten metal by such materials or difficulties during the melting process. This decontamination process is usually referred to as "decoating" and is conventionally carried out as a separate step before the decoated metal is melted and processed further.

An example of a known decoating process is disclosed in International patent application Serial No. PCT/CA91/00252 published under publication number WO 92/01825 on Feb. 6, 1992 and assigned to the same assignee as the present application. The procedure disclosed in this application involves the introduction of the metal scrap into a fluidized bed of small particles at a temperature below the melting point of the metal in the presence of an oxidizing gas. An antioxidant material is introduced into the bed to prevent undue oxidation of the metal itself. The decoated metal is withdrawn from the fluidized bed after a suitable time to ensure completion of the decoating process, usually 3 to 15 minutes (more preferably 5 to 6 minutes), and is then subjected to a melting operation in a different apparatus and then to further recycling.

While this process is very effective for decoating many types of contaminated metals, it does not always work as effectively as might be desired with certain other materials, e.g. metal foils. Such foils are of very thin gauge, so the surface area is high and undue oxidation may take place during the decoating operation, thus reducing metal yields. Furthermore, the lightness of such scrap material means that the foil is easily disturbed by air currents and is thus difficult to handle in conventional types of decoating operations.

While the above disadvantages are most apparent when treating metal foil scraps, traditional decoating operations normally result in some metal loss when treating metal scraps of all kinds and usually require large capital outlays for the decoating equipment.

There is therefore a need for an improved procedure for decoating aluminum scraps of all kinds, and especially aluminum foil scraps.

SUMMARY OF THE INVENTION

Accordingly, an object of the present invention is to improve the effectiveness and efficiency of aluminum scrap metal recycling operations.

Another object of the invention is to reduce capital outlays and operating costs of scrap metal recycling operations.

Yet another object of the invention, at least in its preferred forms, is to facilitate the recycling of aluminum foil and packaging scraps contaminated with organics.

Other objects, advantages and features of the invention will be apparent from the following disclosure.

According to one aspect of the present invention, there is provided a method of recovering an aluminum-containing metal having a melting point from a scrap material containing said metal and an organic contaminant, comprising creating a fluidized bed of solid particles; maintaining at least a zone of said bed at a temperature in the range of said melting point to 1000° C.; introducing said scrap material into said zone to bring about decoating of the metal within a period of time in the range of about 1 to 40 seconds; at least partially melting the metal in said zone to produce a molten recoverable metal; and removing said recoverable metal from said fluidized bed.

According to another aspect of the invention, there is provided a method of recovering and separating from each other a plurality of aluminum-containing metals of different melting points from a scrap material containing said metals and an organic contaminant, comprising creating at least one fluidized bed of inert particles; maintaining a plurality of separate zones in said at least one fluidized bed at different temperatures effective to melt individual aluminum containing metals of said scrap; passing said scrap material progressively through said zones in such order that said scrap material is exposed to progressively higher temperatures; and removing said aluminum-containing metals in molten form from said separate zones; wherein said scrap is decoated in a first one of said zones within a time in the range of 1 to 40 seconds.

According to yet another aspect of the invention, there is provided a method of recovering a metal from a scrap material containing said metal and an organic contaminant, comprising creating a fluidized bed of solid particles containing a mixture of $AlF_3$ and a fluoride selected from the group consisting of NaF and cryolite; maintaining a zone of said bed at a temperature in the range of a melting point of said metal and 1000° C.; introducing said scrap material into said zone thereby to cause decoating of said scrap and at least partial melting of said metal to form recoverable metal; and removing said recoverable metal from said fluidized bed.

The present invention, at least in its preferred embodiments, makes it possible in a single process to maximize the recovery of aluminum or an aluminum alloy from scrap, to recover organic values as useful energy and to separate mixtures and alloys of different aluminum-containing metals, if the latter is necessary or desired.

It has been found that the removal of organics from scrap by introducing the scrap into a fluidized bed having the indicated temperature for the stated time avoids substantial metal oxidation because of the excellent temperature control and high heat transfer capacity that can be achieved in this type of heating device. Essentially simultaneous organics removal and metal melting maximizes the heat and energy efficiency of the entire process and makes it possible to use less expensive equipment and to reduce operating costs. There is also the potential for the recovery of organics that can themselves be used to produce energy.

The invention is suitable for recycling aluminum scrap materials containing a high level of organics, e.g. from 10 to 90% by weight (more usually 20-80% by weight).

The invention is particularly advantageous when applied to the treatment of aluminum foil scrap, particularly thin gauge foil scrap and packaging material of 4 to 500 microns (more usually 6-400 microns) in thickness, because there is much less opportunity for the oxidation of the metal and much less difficulty in handling the scrap than is the case with conventional decoating and melting equipment.

DETAILED DESCRIPTION OF THE PREFERRED EMBODIMENTS

In the present invention, decoating of aluminum scrap material and at least partial melting of the decoated metal are carried out essentially at the same time in a single fluidized bed or a single zone of such a bed. This is made possible by the surprising fact that metal decoating can be carried out in a very short time (1 to 40 seconds and more usually 2 to 30 seconds and often 2 to 10 seconds) when the scrap is exposed to high temperatures in a fluidized bed immediately prior to or during metal melting without causing undue oxidation of the metal or other problems. This "flash decoating" is presumably due to a combination of the high temperatures (generally the melting point of the metal to 1000° C., more usually the melting point of the metal to 900° C. and most preferably 700° to 850° C.) and the high efficiency of heat transfer and precise temperature control achievable in fluidized beds. Partial or complete melting of the metal may require more than the 40 seconds maximum for decoating but is carried out at the same time or in a closely following step without reducing the temperature of the scrap.

While, as will be seen from the following disclosure, multiple zones or beds at different temperatures may be employed in the present invention for separating alloys having different melting points, a characteristic of the present invention is that combined decoating and at least partial melting of the metal takes place in a first such zone or bed.

As already stated, the temperatures employed in the decoating and melting zone of the fluidized bed must be in the range of the melting point of the metal to about 1000° C. When the metal is aluminum, the lower temperature of the range is 660° C., corresponding to the melting point of aluminum. Aluminum alloys tend to have lower melting points. For example, cast aluminum alloys may have melting points as low as about 560° C., while wrought alloys (mainly foil and sheet material) may have melting points as low as about 580° C. The important point, of course, is that whatever the melting point of the particular metal content of the scrap material, the combined decoating and melting bed or zone should have a temperature above this melting point.

The scrap is normally introduced into the decoating and melting zone or bed at ambient temperature without any prior heat treatment, although pre-heating to a temperature of about 200° C. may be carried out to effect drying if the scrap contains moisture. However, it is alternatively possible to pass the scrap material through a partial decoating stage prior to its introduction into the decoating and melting zone or bed. The partial decoating stage would subject the material to a temperature below the melting point of the metal, usually in oxidizing conditions. However, the residence time within such a stage would be less than that required for complete decoating of the metal. Preliminary decoating of this kind may be useful when the scrap contains a high proportion of organics.

The residence time of the scrap in the combined decoating and melting bed or zone required for proper decoating depends on several factors, e.g. the type of scrap being treated, the condition of the scrap (e.g. finely divided or in large pieces), the temperature of the zone, the available oxygen, etc. Clearly, when the ratio of organics to metal in the scrap is high, the residence time will be towards the upper end of the stated range, and when the ratio is low, the residence time may be towards the lower end of the range. Higher temperatures reduce the time required for decoating and can thus be employed for reducing residence times required for decoating. In any event, a residence time of at least one second is normally required to complete the removal of the organic components. On the other hand, the conditions within the fluidized bed or zone should be made such as to ensure that decoating is complete within the stated 40 seconds.

While decoating of the scrap takes place within 40 seconds, the scrap may if desired be retained in the combined decoating and residence zone or bed for a longer period, e.g. to bring about complete melting if the scrap contains large massive metal pieces. In any event, the metal contained within the scrap is normally decoated and at least partially melted within the 40 second time limit.

The decoating time plus the time required for partial or complete melting of the metal normally corresponds to the time taken for the scrap material to descend under its own weight through the bed or zone when introduced from above. If the residence time achieved in this way is found to be either insufficient or too long, then adjustments can be made by changing either the temperature of the bed or zone or its vertical extent or by providing a generally horizontal grid sized according to the properties of the scrap in order to maintain large particles of the scrap in the treatment zone, while allowing molten droplets or partially melted metal particles of reduced size to pass through.

The procedure by which the metal scrap is decoated in the fluidized bed depends on the amount of oxygen made available to the scrap, e.g. in the fluidizing gas or in a gas introduced separately from the fluidizing gas. In an oxygen-rich environment, e.g. when fluidizing the bed with air, the organics undergo complete combustion (full oxidation) in the bed itself to form carbon dioxide and water vapour. In contrast, if there is no oxygen present in the bed, the organics are thermally decomposed (pyrolysed) to form a hydrocarbon-rich gas, but they leave a solid char (mainly carbon) on the metal surface. It has been found that the presence of char reduces the amount of metal recovered. The char can be removed by making a certain small amount of oxygen available in the bed to burn off the char by converting it to carbon monoxide or carbon dioxide. Thus by limiting the amount of oxygen in the bed, it is possible to decoat the metal completely while producing a combustible gas containing oxidizable gas and volatilized tar from the decomposition of the organic contaminants. This partial oxidation procedure is referred to as "gasification" of the contaminating organic materials of the scrap as opposed to complete combustion on the one hand and strict pyrolysis on the other hand. Generally, gasification is the preferred procedure for use in the present invention and it still results in decoating within a suitable rapid time period. The recovered gas may be of low or medium heating value and can be burned directly in an afterburner to recover its energy, or can be further processed to form "producer gas" by acid gas removal and a cracking operation, and can be burned for heat production during the process or saved for future use.

The amount of oxygen (ratio by weight of oxygen to organic materials) introduced into the bed to bring about gasification without leaving a char depends on the ratio of char to volatiles formed upon pyrolysis of the organics. This differs from contaminant to contaminant, but can easily be determined by simple tests. The amount of char can also be minimized by increasing the decoating temperature. Usually the oxygen to organics ratio used in the invention is equivalent to 20 to 40% of the stoichiometrical amount of oxygen required for complete combustion of the organics, and is usually equivalent to 3 to 6 parts by weight of air per part by weight of organics.

When large amounts of oxygen are made available for combustion, it may be necessary to reduce the feed rate of the scrap into the bed or to cool the bed by means of a water jacket or the like, to prevent undue heat generation causing temperatures to rise above the stated range. In contrast, when no oxygen is present and the organics are pyrolysed, no heat is generated within the bed itself and it is necessary to heat the bed to the required temperature, either by using a preheated fluidizing gas or by means of a surrounding heating jacket or the like. In the case of gasification (when making small amounts of oxygen present), it may be possible to adjust the oxygen to scrap ratio to produce both a desirable rate of gasification and sufficient heat generation within the bed to make the desired decoating and melting temperature self-sustaining. Of course, during start-up, the bed may be heated in the ways indicated above to reach the desired reaction temperature before the reaction can generate enough heat to make further heat input unnecessary.

As in the case of the decoating process described in International patent application PCT/CA91/00252 referred to above, antioxidants may be used in the fluidized bed in order to reduce the extent of oxidation of the metal that occurs during the decoating of the scrap. Suitable antioxidants include, for example, metal fluorides (e.g. $MgF_2$, $CaF_2$, $AlF_3$, $Na_3AlF_6$, $NaAlF_4$ and $NaF$) that may be in the form of solid particles forming part or all of the fluidizing particles of the bed, or may be introduced into the bed as gases or liquids. The need for such antioxidants varies with the likelihood of oxidation of the metal, which increases with the amount of oxidizing gas present in the bed, the surface area of the scrap, the reactivity of the metal (certain alloys may be quite reactive, e.g. Al—Mg alloys), the temperature of the bed, etc. When the risk of metal oxidation is low, antioxidants can be dispensed with entirely, although they are normally used.

It has furthermore been found that certain compounds act as coalescing agents for the droplets of molten metal produced as the metal melts in the fluidized bed. Such droplets are normally surrounded by an oxide envelope and have difficulty in joining together unless a coalescing agent is present. The materials suitable as coalescing agents are often the same as those suitable as antioxidants. In addition, however, certain chlorides (e.g. $MgCl_2$) are also suitable. The coalescing agents also have the effect of reducing the contamination of the molten metal with solid particles from the bed since wetting of the solid particles by the molten metal is reduced.

As in the case of the antioxidants, while coalescing agents are normally used in the present invention, they may be omitted if desired. For example, while it is normally desirable to recover the molten metal in the form of a continuous pool or stream, it may in some cases be desirable to recover a collection of individual droplets, in which case no or less coalescing agent should be used. However, it should be noted that neither technique can successfully be employed at temperatures above about 1000° C. because, above this temperature, sintering between oxide coated metal droplets occurs such that individual solid droplets cannot be collected. The resultant monolithic mixture of oxide and metal has no commercial value.

When the antioxidants and/or coalescing agents are solids, the amounts normally employed fall in the range of 0.05 to 10% by weight of the bed media, with 0.5 to 5% being more preferred. The remaining fluidizing particles are normally an inert material, such as alumina particles smaller than about 35 Tyler mesh (500 microns diameter).

Surprisingly, it has been found that a very effective melting and coalescing effect can be obtained when a mixture of antioxidants and coalescing agents is employed, particularly when decoating and melting very thin (e.g. 25–85 micron) foil material. Metal foils of this thickness tend to oxidize very rapidly when exposed to air at melting temperatures and metal yields may consequently be low. Moreover, the foils tend to form very fine droplets when melted in a fluidized bed and such droplets coalesce only with difficulty. A combination of aluminum fluoride ($AlF_3$) and sodium fluoride ($NaF$) or of aluminum fluoride ($AlF_3$) and cryolite ($Na_3AlF_6$) provides particularly good oxidation protection and coalescence during the treatment of such materials. Preferred concentrations range from 0.5 to 5% by weight $AlF_3$ combined with 0.125 to 0.5 % by weight NaF or cryolite (the percentages being based on the total weight of the bed media). Ideally, when NaF and $AlF_3$ are employed, the $NaF/AlF_3$ weight ratio is below 0.5. Moreover, instead of adding the materials separately to the bed, a molten salt mixture may be formed and added to the bed with similar results. For example, a molten salt mixture of five parts by weight of NaF and three parts by weight of $AlF_3$ giving chiolite ($Na_3Al_3F_{14}$) may be added alone to the bed in an amount of about 1.5% by weight of the bed media, or in combination with about 1.5% $AlF_3$. When such materials are used, it has been found that metal recoveries as high as 85% can be achieved, even with foils as thin as 25 microns.

Incidentally, when very thin foil of the above kind is being treated, it is desirable to maintain the velocity of the fluidizing gas below about 0.5 m/s, and preferably between 0.2 and 0.5 m/s, when the gas is air or other oxygen-containing gas, in order further to minimize oxidation of the metal of the foil.

Once the metal has passed through the decoating and melting zone, it can either be cooled to form a solid block or separate solid droplets or it can be maintained as a liquid pool for subsequent use, e.g. as a feed for an adjoining casting operation.

In some cases, the scrap material may comprises a mixture of different alloys of aluminum having different melting points, and it may be desirable to separate the alloys from each other as part of the recycling procedure. The desired separation can be brought about in the process of the present invention by moving the scrap from one bed to another of higher temperature (or from one zone of a bed to another zone of the same bed at higher temperature). In the first bed or zone, the temperature is maintained above the melting point of the alloy having the lowest melting point so that decoating and partial melting takes place in this zone. The molten metal is recovered and the remaining unmelted metal is passed on to a bed or zone at a temperature above the melting point of further metal constituent of the scrap. This further constituent is melted and is recovered. Depending on the number of constituent metals in the scrap, the remaining unmelted metal (if any) may be passed on to a further bed or zone of higher temperature, and so on, until all of the constituent metals of the scrap have been separately recovered as molten metals. Since the melting point of aluminum itself is 660° C. and aluminum alloys tend to melt at lower temperatures (as indicated above), the various beds or zones used for separating aluminum alloys generally have increasing temperatures falling within the range of 560°–660° C., although the temperature of the final zone may be any temperature up to 1000° C., but it should be no higher than necessary to avoid undue oxidation of the metal.

This procedure is made possible because of the extremely precise temperature control that is achievable within separate zones of a single fluidized bed or among several different fluidized beds. The scrap is held in the first zone or bed for a time within the stated range until the metal is decoated and until the alloy with a lowest melting point is completely melted and separated. The residual metal in then transferred to the subsequent zone(s) or bed(s) and held for times sufficient to achieve melting and separation of the additional alloys or metals.

When different beds are used, the residual metal from one bed is preferable removed and conveyed to the next bed by means of an insulated conveyor or by pneumatic means to prevent undue heat loss.

Having discussed principles underlying the present invention in general terms, specific preferred embodiments are described in the following with reference to the accompanying drawings.

Figure 1:
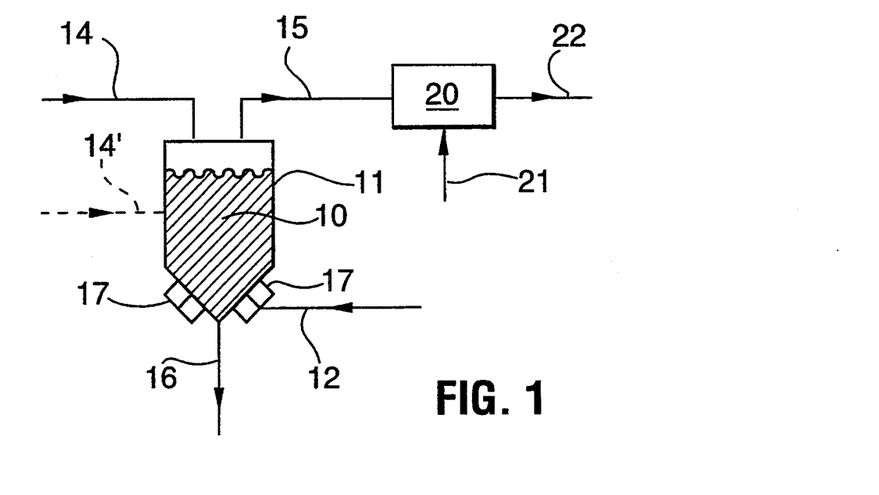
FIG. 1 is a schematic representation of an apparatus for carrying out a method according to a first preferred embodiment of the invention.

A first apparatus for carrying out the method of the invention is shown in FIG. 1. This apparatus makes use of a single bed 10 of particles (e.g. of alumina, silica or $MgO.Al_2O_3$) held in a container 11 and fluidized by a gas 12 introduced into the bed at the bottom of the container. The fluidizing gas 12 is introduced into the container via numerous holes supplied by a manifold 17 so that proper fluidization of the particles is effected.

Metal scrap (preferably pre-shredded) is introduced into the top of the container at 14 or directly into the bed through a side wall of the container as shown by dotted line 14'. Waste gases are removed from the container at 15 and molten metal 16 is tapped from the container at the lowermost point. Although not shown, the apparatus may be provided with a gas/liquid separator adjacent to the lowermost point to ensure proper removal of the molten metal.

The gas 12 consists of nitrogen (or other unreactive gas) with an amount of oxygen that may, if desired, be added only periodically. The temperature of the bed 10 is maintained above the melting point of the metal in the scrap (e.g. generally above 660° C. when the metal to be melted is aluminum) but below 1000° C., so that essentially simultaneous decoating and metal melting takes place in the bed. Because of the limited amount of oxygen present in the bed, the waste gas 15 discharged from the container 11 contains incompletely oxidized organic materials that are transferred to a reactor 20 supplied with a small amount of oxygen or air 21 to produce a product gas 22.

If a minimal amount of oxygen or air is introduced into the reactor 20, the product gas 22 is a mixture of $CO_2$, $H_2$, CO and volatile hydrocarbons. This combustible mixture may be collected as synthesis gas and may be used later for generating energy. If a more than stoichiometrical amount of oxygen or air 21 is introduced into the reactor 20, the product gas 22 is largely $CO_2$ and water vapour, and considerable energy of combustion is generated in the reactor 20 that may be removed by suitable heat exchangers (not shown) and used in the process. Most preferably, the amount of oxygen in the gas is sufficient only to remove char from the metal surfaces and to produce complete gasification of the organic contaminants.

Figure 2:
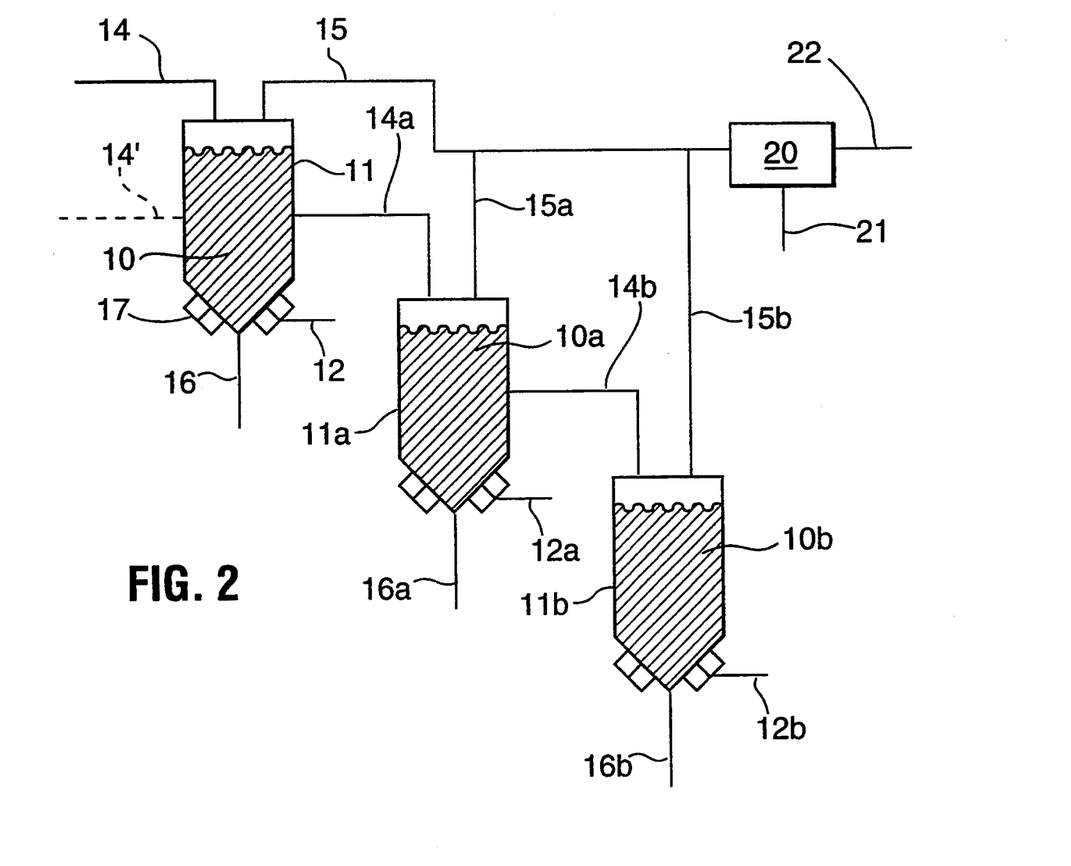
FIG. 2 is a schematic representation of an alternative apparatus for carrying out a method according to a second preferred embodiment of the invention.

FIG. 2 shows a further embodiment in which a series of fluidized beds 10, 10a, 10b are provided in containers 11, 11a, 11b, respectively. These beds are maintained at different temperatures that increase progressively from bed to bed. The metal scrap is introduced at 14 or 14' into the first bed 10 where it undergoes decoating and melting of a first low melting point constituent metal. The remaining unmelted decoated scrap is then introduced at point 14a into the second bed 10a where a higher temperature causes melting of a second metal constituent metal. The residual metal scrap is then introduced at 14b into the third bed 10b held at a higher temperature (e.g. 750° C.) to cause complete melting if the metal. The different molten metals are tapped off at 16, 16a, 16b and the waste gases 15, 15a, 15b are combined and treated in the same way as in the previous embodiments. The fluidizing gases 12, 12a, 12b may be nitrogen and oxygen mixtures, although if desired less (or no) oxygen need be present in the fluidizing gases 12a and 12b since essentially no organic material is introduced into containers 11a and 11b.

Another preferred procedure is described with reference to FIG. 3 of the accompanying drawings. In this procedure, shredded scrap 40 is fed into a fluidized bed 42, made up of alumina particles having an average diameter of about 300 microns and about 2.5% $AlF_3$ as antioxidant and about 0.125% NaF as coalescing agent, held in a reactor 43 through a double flap gate 44 allowing control of the atmosphere inside the bed reactor. The bed is fluidized with air 45 and nitrogen 46 preheated to a temperature between 700° and 800° C. This temperature is high enough to decompose the organic material in the scrap (plastics, paper, etc.) within a residence time of 5 to 20 seconds and also to melt the aluminum. The scrap feed rate is adjusted according to the amount of air used to fluidize the bed with a view to maintaining the bed temperature solely by combustion of residual carbon. The $AlF_3$/NaF content of the bed causes the aluminum particles to coalesce as they melt and drain to the bottom of the bed where a liquid/air separator 47 separates the alumina particles from the molten aluminum. The molten aluminum accumulates in a reservoir 48, from which it can be tapped to form small remelt ingots or transferred to crucibles as a liquid.

The gas released from the organics into the fluidizing air can be viewed as a low to medium energy value combustible gas. The oxygen level in the freeboard 49 (space above the fluidized bed) is monitored and controlled at a low level (<4% by volume) to avoid combustion in this area. The gas 50 exiting the freeboard is passed through a cyclone 51 where any particles entrained from the bed are removed. At the exit of the cyclone 51, the combustible gas flow is passed through a fixed bed 52 of rocks 53 used as a flame arrestor to prevent flame flashback and ignition of the gas inside the cyclone and the reactor. Large particles of dolomite (5-10 mm), or similar alkaline material, are used to form the fixed bed since the dolomite neutralizes acid gases such as HCl and HF present in the gas. The exiting gas is processed through an afterburner and a scrubber before being released to a stack 54.

Figure 4:
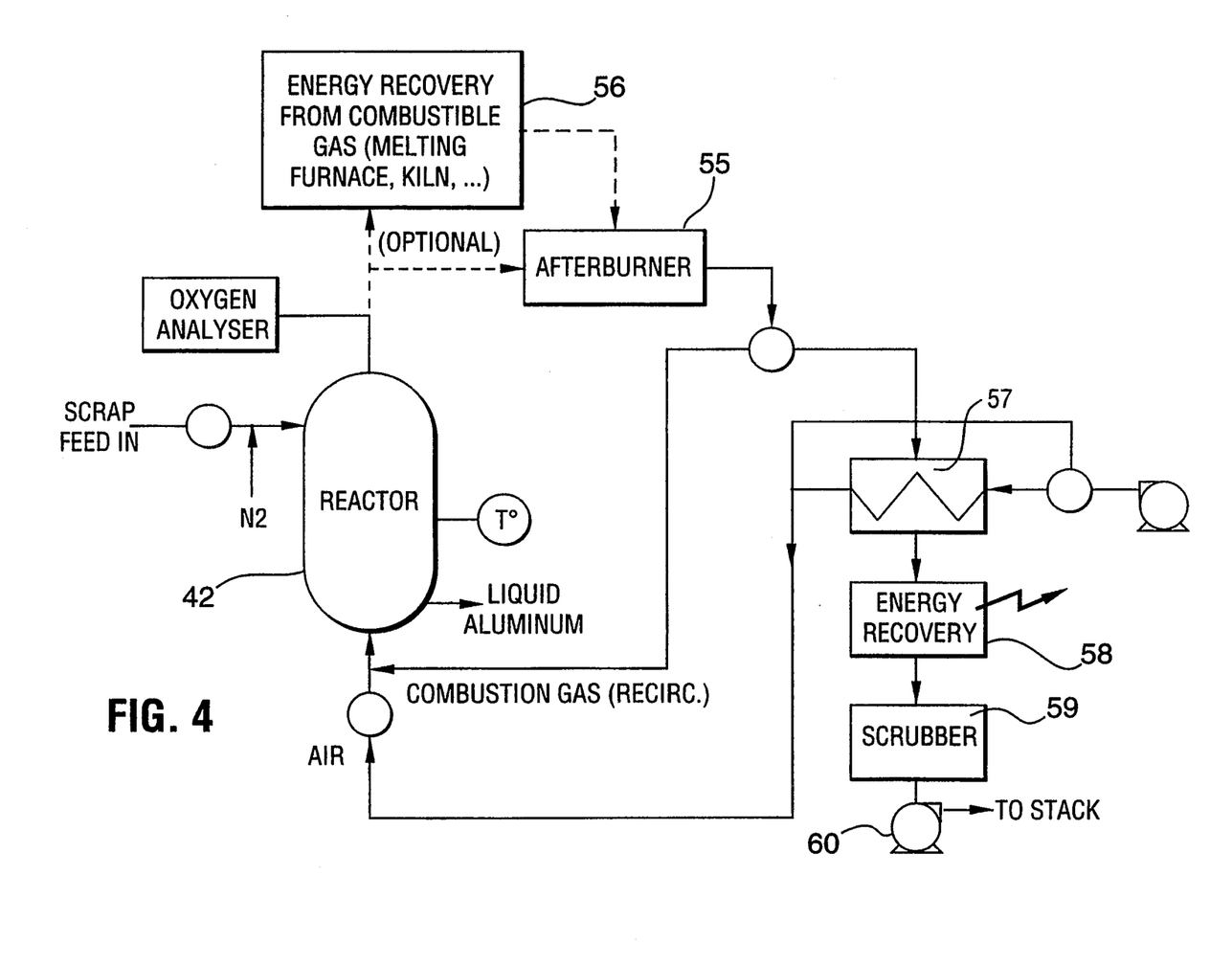
FIG. 4 is a diagram similar to FIG. 3 additionally showing equipment used for treating gases obtained by the method of the invention.

FIG. 4 schematically shows a similar arrangement illustrating the gas flow through an afterburner 55 or through apparatus for energy recovery 56. The resulting hot gas from the afterburner is passed through a heat exchanger 57 for heating the fluidizing air and is then passed to equipment 58 for energy recovery, and through an acid and particulate scrubber 59 and finally to a stack 60. It is to be noted that in this apparatus, combustion gas from the afterburner 55 may also be added to the fluidizing air for the bed 42.

Figure 3:
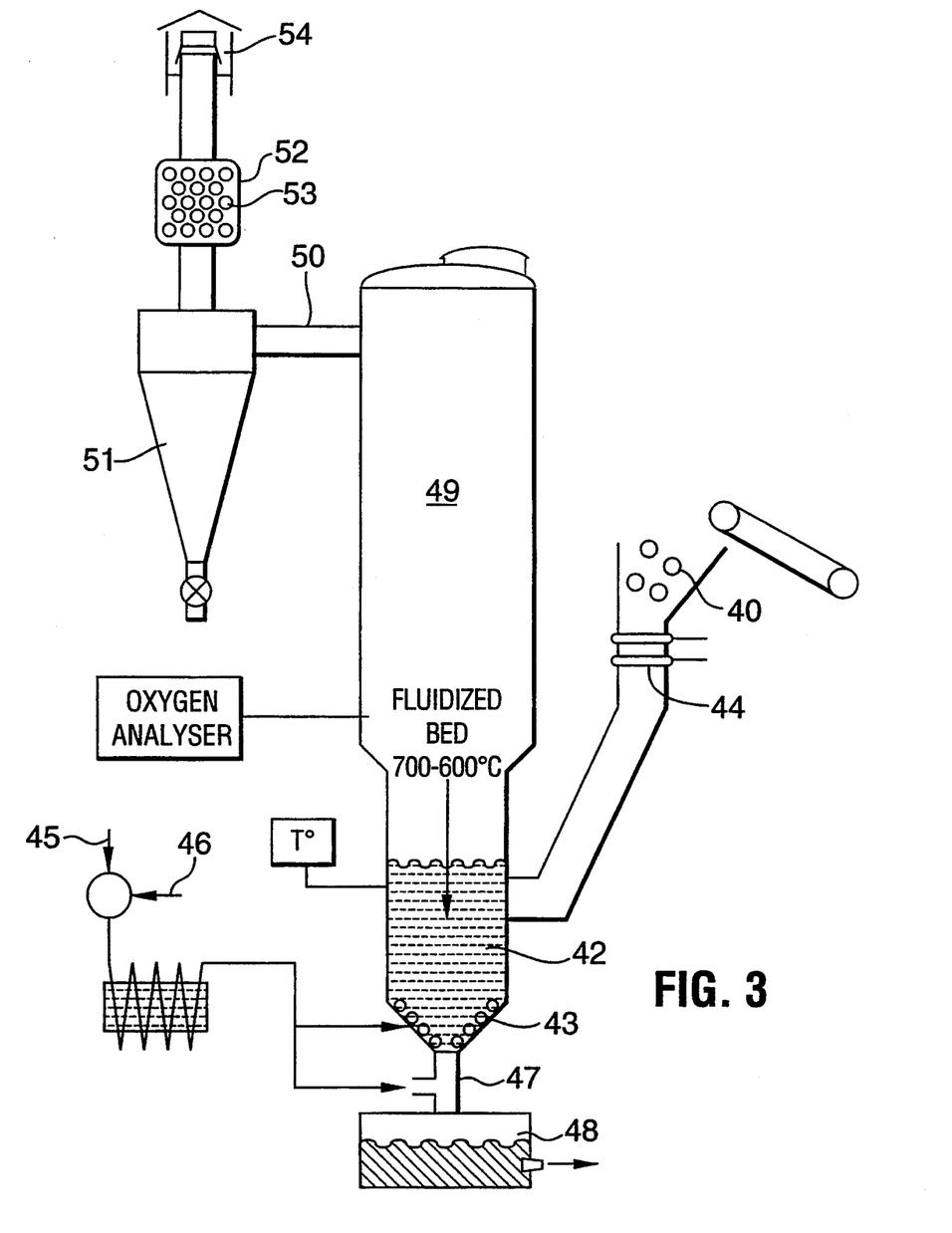
FIG. 3 is a schematic diagram of equipment for operating a further embodiment of the method of the invention.

The equipment illustrated in FIGS. 3 and 4 is most effective for the treatment of scrap having a high content of organics, such as most packaging scrap. Compared with conventional decoating, the consumption of air is reduced by a factor of 4 to 5, which leads to a similar reduction of the cross-sectional area of the fluidized bed. To achieve an acceptable decoating efficiency, the apparatus is operated most preferably at a temperature of 660°-800° C.

The invention is illustrated below by the following Examples. These Example should not be construed as limiting the scope of the invention.

EXAMPLE 1

In order to demonstrate that aluminum melting in a fluidized bed was feasible, a small fluidized bed of the type shown in FIG. 1 of 10 inches in diameter containing particles of silicon dioxide was fluidized with nitrogen. Nitrogen was used to minimize oxidation and to stimulate pyrolysis of the organic constituent. The temperature of the bed was controlled at 800° C.

About one kilogram of aluminum coated with 3% of lacquer (used beverage cans) was fed into the bed. Combined decoating and melting of the metal took place in ≦5 seconds. Liquid aluminum was recovered from the bottom of the bed.

EXAMPLE 2

Two tests were carried out in a fluidized bed having a cross-sectional area of 625 $cm^2$ containing particles of alumina with 5% by weight of $AlF_3$. The bed was fluidized with air and maintained at a temperature of 750° C.

In the first test, 500 g of aluminum/paper laminate scrap having a thickness of 80 μm and an organic content of 15% by weight was introduced into the bed. Combined decoating and melting of the metal took place in ≦5 seconds. About 350 g of metallic aluminum was recovered from the bottom of the bed, representing a metal recovery of about 82%.

In the second test, 500 g of aluminum foil laminate scrap having a thickness of 25 μm having an organic content of 0% was introduced into the bed. Combined decoating and melting of the metal took place in ≦5 seconds. About 370 g of metallic aluminum was recovered from the bottom of the bed, representing a metal recovery of about 74%.

EXAMPLE 3

Seventy five grams of domestic aluminum foil (25 microns in thickness) was introduced into a bed of high density alumina particles (1600 g) having a size distribution between 210-500 microns containing 2.5% by weight of $AlF_3$ and 0.125% by weight NaF fluidized with air at a velocity of 0.25 m/s. The temperature of the bed was about 800° C. and decoating and melting took place within a time of ≦5 seconds.

The metal was recovered by screening the melted product and the bed media. The metal recovery was 94% and the recovered metal was bright and agglomerated.

EXAMPLE 4

Five hundred grams of ELBH material (60 microns in thickness and containing 15% by weight of organics) was introduced into a bed of bubble alumina particles (10,000 g) containing 5% by weight of $AlF_3$ and 0.25% by weight cryolite fluidized with air at a velocity of 0.20 m/s. The temperature of the bed was about 750° C. and decoating and melting took place within a time of ≦5 seconds.

The metal was recovered by screening the melted product and the bed media. The metal recovery was 76% and the recovered metal was bright and agglomerated.

EXAMPLE 5

One hundred and five grams of flat heater material (20 microns in thickness, containing 28% by weight of organics) was introduced into a bed of high density alumina particles (1600 g) having a size distribution between 210–500 microns containing 2.5% by weight of $AlF_3$ and 0.125% by weight NaF fluidized with air at a velocity of 0.20 m/s. The temperature of the bed was about 750° C. and decoating and melting took place within a time of $\leq 5$ seconds.

The metal was recovered by screening the melted product and the bed media. The metal recovery was 68% and the recovered metal was bright and agglomerated.

EXAMPLE 6

Seventy five grams of domestic aluminum foil (25 microns in thickness) was introduced into a bed of high density alumina particles (1600 g) having a size distribution between 210–500 microns containing 0.5% by weight of a salt made from NaF and $AlF_3$ in a ratio $NaF/AlF_3$ of 0.5/1 fluidized with air at a velocity of 0.20 m/s. The temperature of the bed was about 800° C. and decoating and melting took place within a time of $\leq 5$ seconds.

The metal was recovered by screening the melted product and the bed media. The metal recovery was 85% and the recovered metal was bright and agglomerated.

EXAMPLE 7

Various tests were carried out to determine the effects of air velocity, temperature and the $NaF/AlF_3$ ratio on metal recovery. The results of these tests are shown in FIGS. 5, 6 and 7, respectively.

Figure 5:
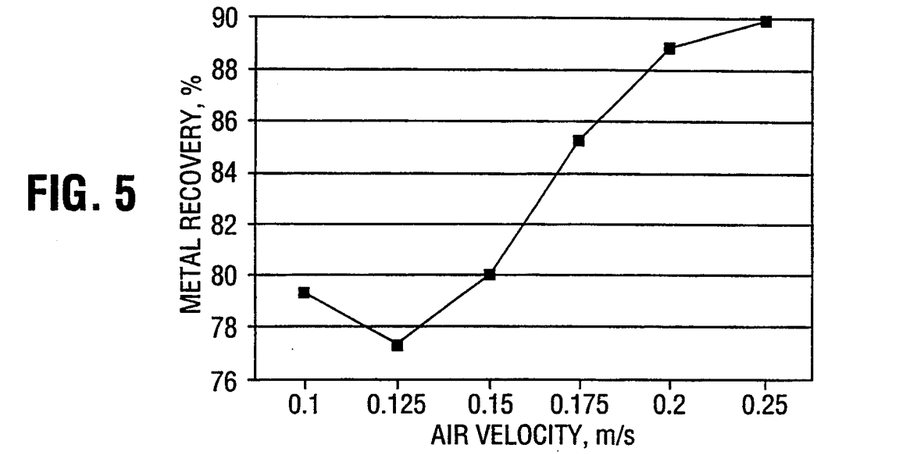
FIG. 5 is a graph of air velocity versus metal recovery for one form of a method according to the present invention.

In the case of FIG. 5, the tests were carried out on 25 micron foil material at 750° C. in a bed containing 2.5% by weight $AlF_3$ and 0.125% by weight NaF using air as the fluidizing gas. The graph shows that recovery rates increased with increasing air flow between 0.125 and 0.25 m/s.

Figure 6:
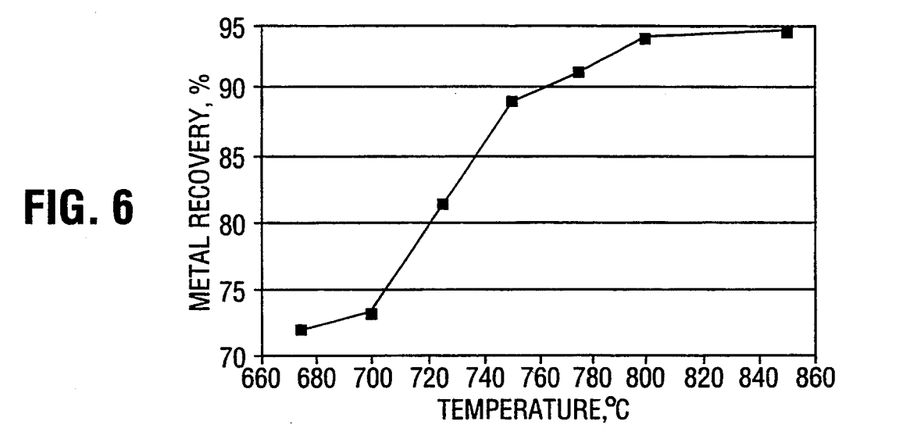
FIG. 6 is a graph of temperature versus metal recovery for one form of a method according to the present invention.

In the case of FIG. 6, the tests were carried out on 25 micron foil material at a flow rate of 0.2 m/s in a bed containing 2.5% by weight $AlF_3$ and 0.125% by weight NaF using air as the fluidizing gas. The graph shows that recovery rates increase with increasing temperature between 680° and 860° C.

Figure 7:
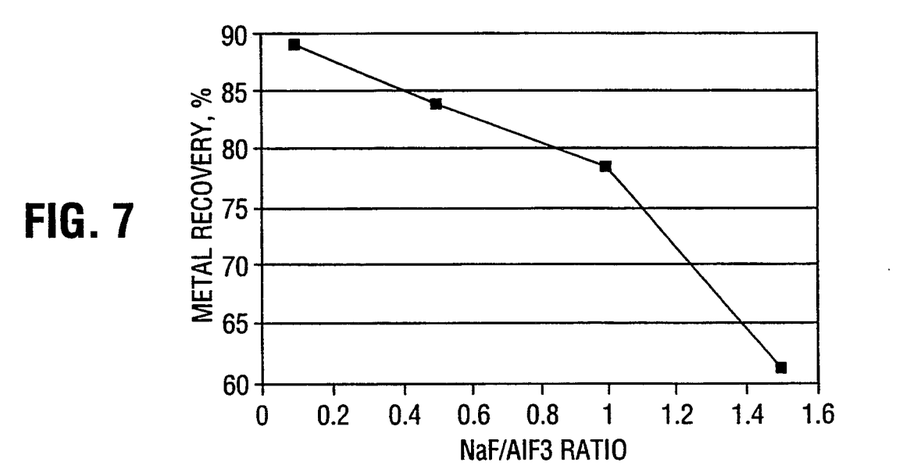
FIG. 7 is a graph of NaF/AlF$_3$ ratio versus metal recovery for one form of a method according to the present invention.

In the case of FIG. 7, the tests were carried out on 25 micron foil material at a temperature of 750° C. at a flow rate of 0.2 m/s using air as the fluidizing gas. The graph shows that recovery rates decrease with increasing $NaF/AlF_3$ ratios between 0.1 and 1.5.

Using this information, optimum recovery conditions can be determined for various systems.

What we claim is:

1. A method of recovering an aluminum-containing metal having a melting point from a scrap material containing said metal and an organic contaminant, comprising:
   creating a fluidized bed of solid particles;
   maintaining at least a zone of said bed at a temperature in the range of said melting point to 1000° C.;
   introducing said scrap material into said zone to bring about decoating of the metal within a period of time in the range of about 1 to 40 seconds;
   at least partially melting said metal in said zone to produce a molten recoverable metal; and
   removing said recoverable metal from said fluidized bed.

2. A method according to claim 1 wherein said aluminum-containing metal is a cast aluminum alloy having said melting point in a range of 560° C. to 660° C.

3. A method according to claim 1 wherein said aluminum-containing metal is a wrought aluminum alloy having said melting point in a range of 580° C. to 660° C.

4. A method according to claim 1 wherein said aluminum-containing metal is aluminum having said melting point of 660° C.

5. A method according to claim 1 wherein said zone of said bed is maintained at a temperature in the range of 700°–850° C.

6. A method according to claim 1 wherein said decoating is completed within a time within the range of 2 to 30 seconds.

7. A method according to claim 1 wherein said scrap contains aluminum foil.

8. A method according to claim 7 wherein said foil has a thickness in the range of 4 to 500 microns.

9. A method according to claim 1 wherein said bed contains an antioxidant.

10. A method according to claim 9 wherein said antioxidant is a solid fluoride.

11. A method according to claim 10 wherein said antioxidant is selected from the group consisting of $MgF_2$, $CaF_2$, $AlF_3$, $Na_3AlF_6$, $NaAlF_4$ and NaF.

12. A method according to claim 1 wherein said bed contains an coalescing agent.

13. A method according to claim 12 wherein said coalescing agent is a solid chloride.

14. A method according to claim 13 wherein said coalescing agent is $MgCl_2$.

15. A method according to claim 1 wherein said bed contains both $AlF_3$ and a fluoride selected from the group consisting of NaF and cryolite.

16. A method according to claim 15 wherein said $AlF_3$ and said fluoride are present in said bed in amounts of 0.5 to 5% by weight in the case of $AlF_3$ and 0.125 to 0.5% by weight in the case of said fluoride.

17. A method according to claim 15 wherein said bed contains both $AlF_3$ and NaF in amounts such that a ratio by weight of $NaF/AlF_3$ is about 0.5 or less.

18. A method according to claim 1 wherein said scrap material contains a foil of said metal having a thickness in a range of 25 to 85 microns, said fluidized bed is fluidized by a gas having a velocity of 0.2 m/s to 0.5 m/s, and said bed contains both $AlF_3$ and NaF in amounts such that a ratio by weight of $NaF/AlF_3$ is about 0.5 or less.

19. A method according to claim 1 wherein said bed is fluidized by air.

20. A method according to claim 1 wherein said bed is fluidized by a mixture of an unreactive gas and insufficient oxygen for complete combustion of said organic contaminant.

21. A method according to claim 20 wherein an amount of oxygen corresponding to 20 to 40% of a stoichiometrical amount required for complete combustion of said organic contaminant is introduced into said bed.

22. A method according to claim 20 further comprising collecting gases exiting said bed as combustible gases.

23. A method according to claim 1 wherein said organic contaminant is selected from the group consisting of paper, plastics, lacquer, paint and oil.

24. A method according to claim 1 carried out in the absence of a coalescing agent, wherein said molten metal is recovered in the form of a collection of separate droplets.

25. A method according to claim 1 wherein said scrap material contains one additional aluminum-containing metal having a higher melting point, wherein said at least one zone of said fluidized bed is maintained at a temperature between said melting point and said higher melting point, thereby avoiding melting of said one additional metal, and further comprising transferring said one additional metal to a second zone of said fluidized bed or a separate fluidized bed maintained at a temperature in the range of said higher melting point to 1000° C. thereby to melt said one additional metal, followed by recovering said one additional metal from said second zone or bed.

26. A method according to claim 25 wherein said scrap material contains a further additional aluminum-containing metal having a yet higher melting point, wherein said second zone of said fluidized bed or said second fluidized bed is maintained at a temperature between said higher melting point and said yet higher melting point, thereby avoiding melting of said further additional metal, and further comprising transferring said further additional metal to a third zone of said fluidized bed or a still further separate fluidized bed maintained at a temperature in the range of said yet higher melting point to 1000° C., thereby to melt said further additional metal, followed by recovering said further metal from said third zone or said still further fluidized bed.

27. A method of recovering and separating from each other a plurality of aluminum-containing metals of different melting points from a scrap material containing said metals and an organic contaminant, comprising:
creating at least one fluidized bed of inert particles;
maintaining a plurality of separate zones in said at least one fluidized bed at different temperatures effective to melt individual ones of said aluminum containing metals of said scrap;
passing said scrap material progressively through said zones in such order that said scrap material is exposed to progressively higher temperatures; and
removing said aluminum-containing metals in molten form from said separate zones;
wherein said scrap is decoated in a first one of said zones within a time in the range of 1 to 40 seconds.

28. A method according to claim 27 wherein said scrap material is decoated in said first of said zones for a time in the range of 2 to 30 seconds.

29. A method according to claim 27 wherein said temperatures of said zones are in the range of 560°-660° C., except for a final zone which may have a temperature up to about 1000° C.

30. A method of recovering a metal from a scrap material containing said metal and an organic contaminant, comprising:
creating a fluidized bed of solid particles containing a mixture of $AlF_3$ and a fluoride selected from the group consisting of NaF and cryolite;
maintaining a zone of said bed at a temperature in the range of a melting point of said metal and 1000° C.;
introducing said scrap material into said zone thereby to cause decoating of said scrap and at least partial melting of said metal to form recoverable metal; and
removing said recoverable metal from said fluidized bed.

* * * * *